W. HILL.
LAWN MOWER.
APPLICATION FILED JULY 21, 1916.
1,230,710. Patented June 19, 1917.
3 SHEETS—SHEET 3
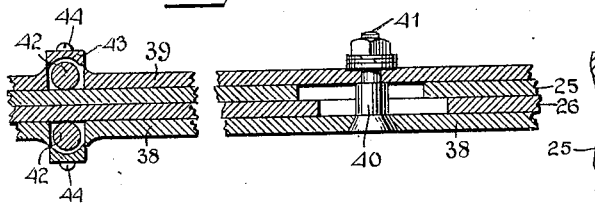
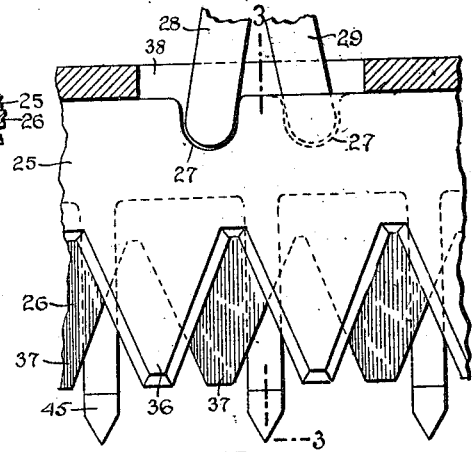
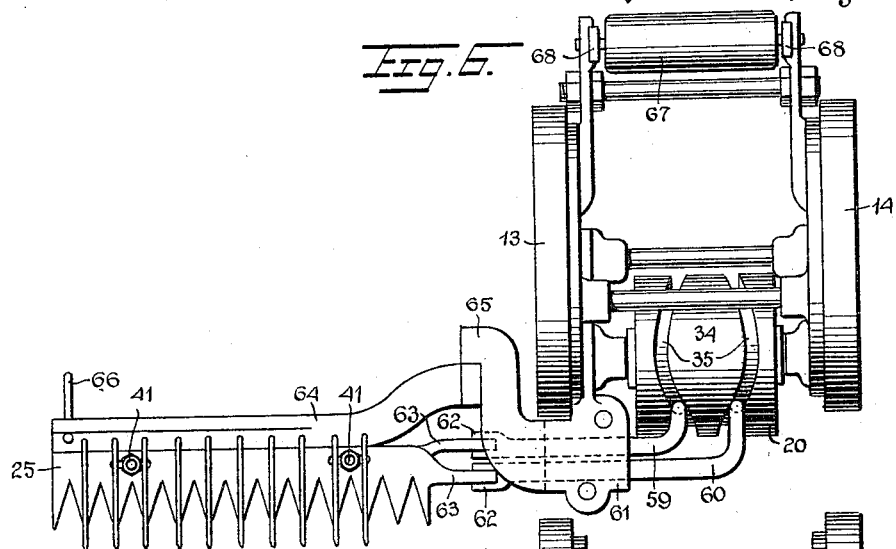
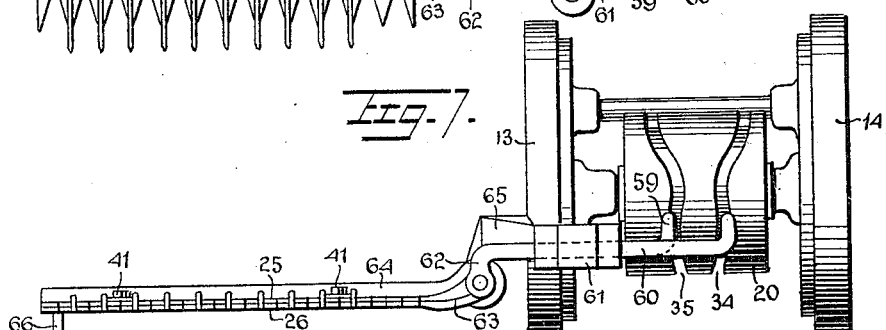
INVENTOR
William Hill
BY
ATTORNEYS
WITNESSES
H. J. Walker

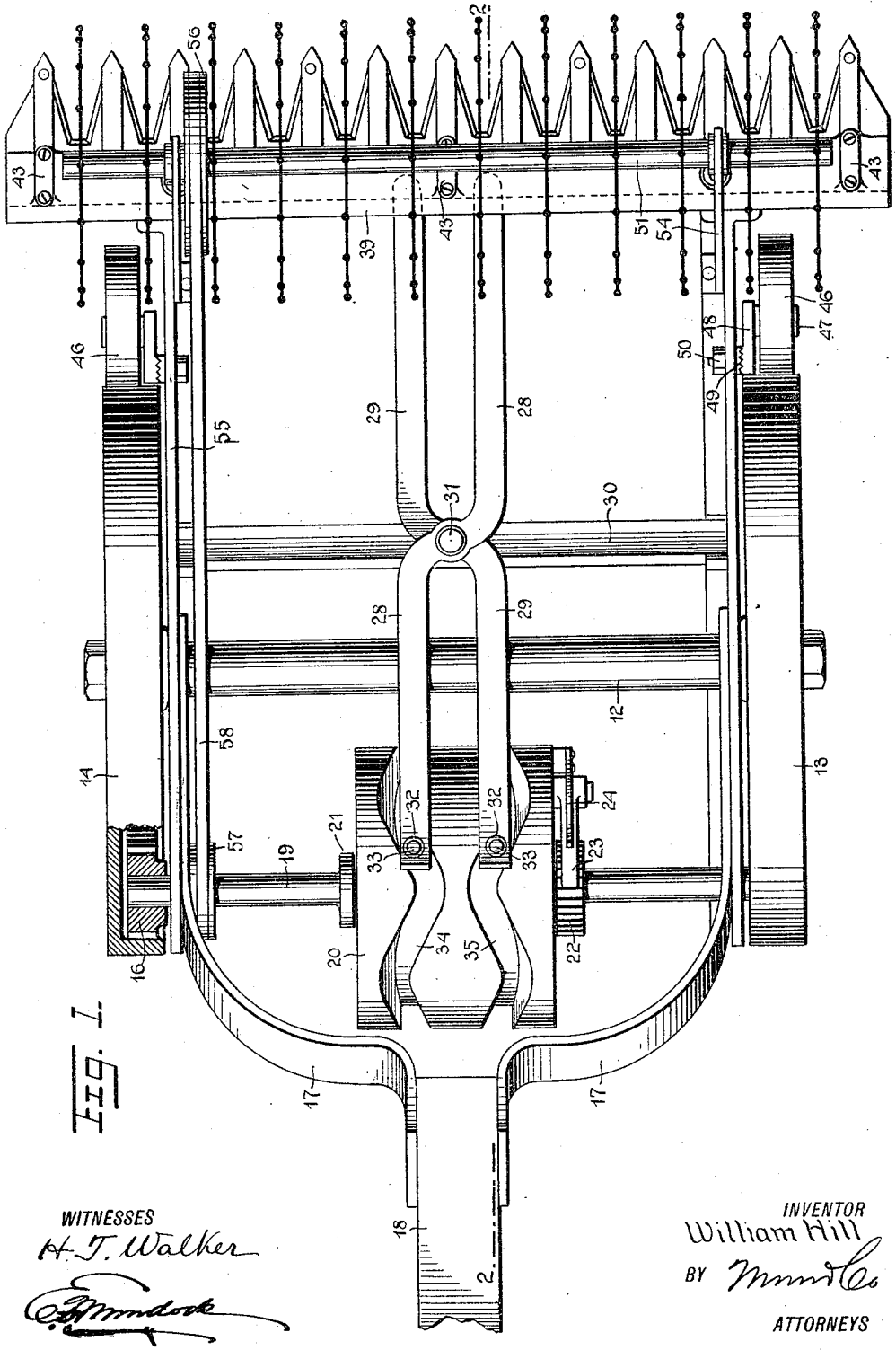

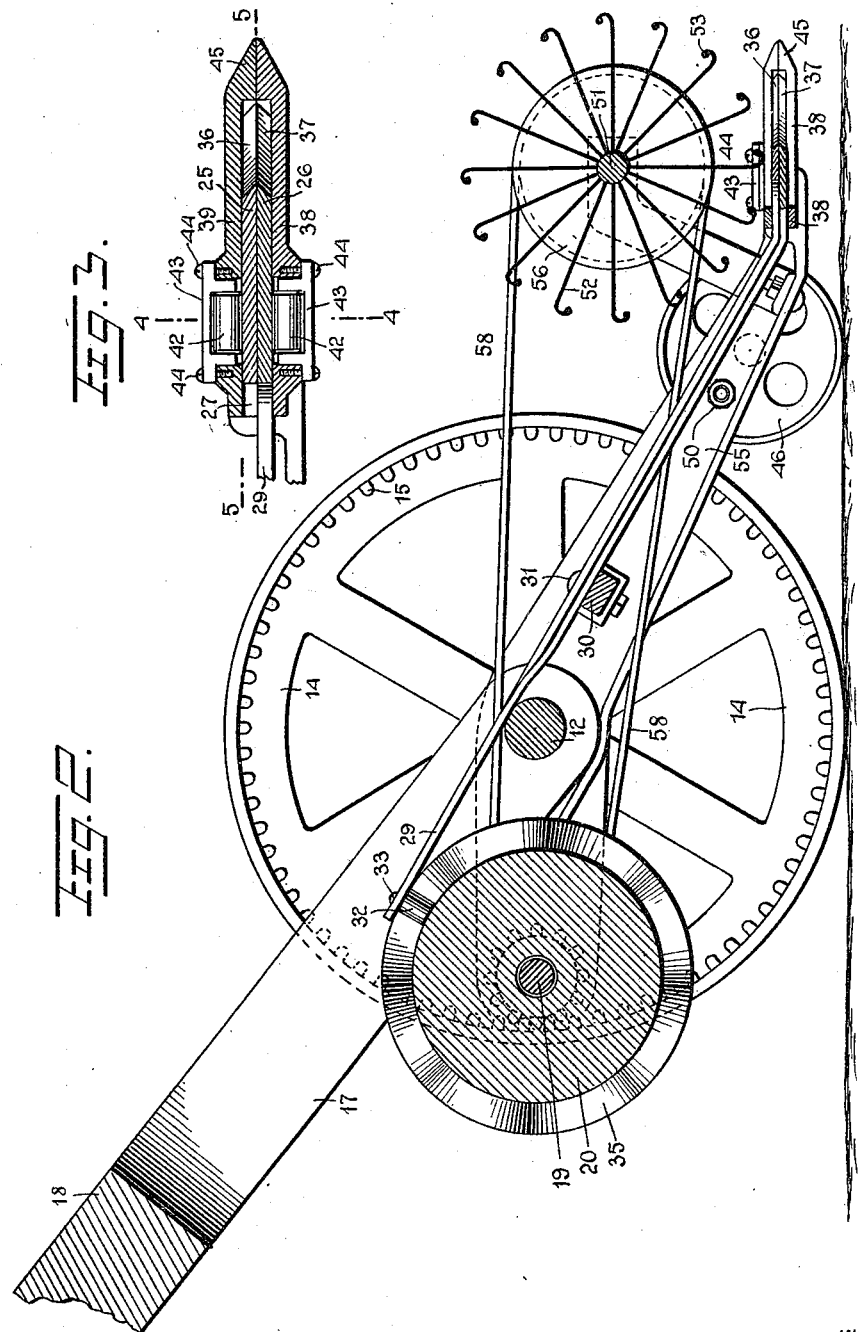

UNITED STATES PATENT OFFICE.

WILLIAM HILL, OF ALEXANDRIA, LOUISIANA.

LAWN-MOWER.

1,230,710.  Specification of Letters Patent.  Patented June 19, 1917.

Application filed July 21, 1916. Serial No. 110,469.

*To all whom it may concern:*

Be it known that I, WILLIAM HILL, a citizen of the United States, and a resident of Alexandria, in the parish of Rapides and State of Louisiana, have invented a new and Improved Lawn-Mower, of which the following is a full, clear, and exact description.

Among the principal objects which the present invention has in view are: To provide mechanism for cutting grass in advance of the supporting structure of the cutter; to prevent the matting of grass; to provide means for regulating the height at which the cutting is effected; and to provide a simplified and inexpensive cutting mechanism.

Drawings.

Figure 1 is a plan view of a mower constructed and arranged in accordance with the present invention;

Fig. 2 is a longitudinal section of the same, the section being taken as on the line 2—2 in Fig. 1;

Fig. 3 is a cross section of the cutter bar, the section being taken as on the line 3—3 in Fig. 5;

Fig. 4 is a detail view on an enlarged scale and in section, showing a fragment of the cutter bar, the section being taken as on the line 4—4 in Fig. 3;

Fig. 5 is a horizontal section of a fragment of the cutter bar and of the blades mounted therein, the section being taken as on the line 5—5 in Fig. 3;

Fig. 6 is a plan view showing, on a reduced scale, a modified form of the invention;

Fig. 7 is a front elevation of the modified form shown in Fig. 6.

Description.

As seen in the drawings, the supporting frame has an axle 12 and supporting wheels 13 and 14. The wheel 14, as best seen in Fig. 2 of the drawings, is provided with internal gear teeth 15, which engage the teeth of a pinion 16. Preferably the wheels 13 and 14 run freely on the axle 12. This construction, however, may be varied by attaching the wheel 14 rigidly to said axle 12. The first-mentioned construction permits the attachment of a yoke 17 rigidly to the axle 12. The latter construction would necessitate the formation of bearings adjacent the ends of the yoke 17 wherein the axle 12 could travel.

Between the members constituting the yoke 17, is held a handle 18, whereby the apparatus is propelled.

The above-mentioned construction provides the wheel 14 as a driving wheel for the countershaft 19 on which the pinion 16 is rigidly mounted. The countershaft 19 has suitable bearings in the yoke 17, and is provided at the center with a double-cam drum 20.

The drum 20 is loosely mounted on the countershaft 19, and is held in position by the collar 21 of the said shaft at one side of said drum, and by a ratchet wheel 22 at the opposite side of said drum. The teeth of the ratchet wheel are pitched to operatively engage a pawl 23 to rotate the drum 20 with the countershaft 19 when the mower is propelled in a forward direction. This arrangement provides for the drum 20 being held non-rotatively when the mower is drawn backward. The pawl 23 is held normally in engagement with the wheel 22 by a spring 24.

The drum 20 constitutes the driving member for the cutter blades 25 and 26. Said blades are each provided with a recess 27 into which extend the ends of the pivoted levers 28 and 29. The levers 28 and 29 are crossed and pivotally mounted on a bar 30 by means of a pin 31. The rear ends of said levers are furnished with rollers 32 which are mounted on pins 33 and extend into slots 34 and 35 peripherally formed in the drum 20.

As shown best in Fig. 1 of the drawings, the slots 34, 35 are curvilinear and oppositely disposed. By this arrangement, the ends of the levers 28 and 29 carrying the rollers 32 are alternately contracted and expanded with a rapidity corresponding to the rotation of the drum 20. This rapidity depends on the ratio between the internal gear of the wheel 14 and the pinion 16 with which said gear is engaged, and also on the speed with which the apparatus is propelled. As the levers 28 and 29 are thus rocked, the blades 25 and 26 are reciprocated in relatively opposite directions, and the severing edges of the cutting fingers 36 and 37 are passed over each other to sever the interposed grass.

The blades 25 and 26 are guidably mounted between the side plates 38 and 39 of a finger bar. The said blades are guided in their movements by rollers 40 spaced at intervals between the plates 38 and 39, and held in position by screw bolts 41, on the shanks of which the said rollers have bearing. The said blades, as best seen in Fig. 4 of the drawings, are held between superposed rollers 42, which rollers are mounted in bearing blocks 43. The blocks 43 are adjustable to take up wear, the means for adjusting said blocks being the screws 44. As the screws are manipulated, the said blocks and rollers 42 are closed upon or released from the blades 25 and 26. Entrance between the blades 25 and 26 and the fingers 36 and 37 is guarded by fingers 45. The fingers 45 are spaced apart a distance corresponding with the spacement of the fingers 36 on the bar 25.

From the foregoing it will be seen that as the mower is advanced, the plane of operation of the cutting bars 25 and 26 is parallel at all times to the axle 12. The height at which the bars operate is governed by an adjustment of the pilot wheels 46. The wheels 46, as best seen in Fig. 1 of the drawings, are mounted on short axles 47 formed at the end of brackets 48. The brackets 48 are provided with a serrated hub, and a bolt for drawing the same into engagement with the serrated face of a holding plate 49. The bolts of the brackets 48 are engaged by nuts 50, by which the serrated faces of the hubs of the said brackets are drawn into engagement with the plates 49.

It is obvious that when the nuts 50 are loosened, the hubs of the brackets 40 may be temporarily released from engagement with the plates 49 and said brackets may be rotated to depress or raise the wheels 46 relatively to the frame of the mower, and thereby elevate or depress the operating level of the blades 25 and 26. When the adjustment has been made, it is made permanent by tightening the nuts 50.

To prevent the clogging of the blades 25 and 26, and to prevent the standing grass avoiding the cutters, there is provided a shaft 51, which is furnished at suitable intervals lengthwise thereof, with whips 52. The whips 52 are preferably constructed of resilient wire, each whip having a weighted end 53, the office of which is to wipe the cutting bar over the severed grass and to lay the standing grass at the moment of severance or preliminary thereto, backward or toward the cutting edges of the said blades 25 and 26. To this end, the shaft 51 is rotated with more or less rapidity as required.

The shaft 51 has bearing in brackets 54. The brackets 54, as seen best in Figs. 1 and 2 of the drawings, are secured to the side bars 55 of the carrying frame. Adjacent one of the brackets, the shaft is provided with a pulley 56, which is operatively connected with a driving pulley 57 on the shaft 19, by a belt 58. As above indicated, the shaft 19 is moved rapidly. Therefore, the rotation of the shaft 51 is rapid as compared with the progress of the machine.

It will be seen that when moving the mower to and from the field of operation, by reversing the pawl 23 to free the drum 20 from the control of the shaft 19, the blades 25 and 26 are held inactive. This gives great freedom of movement to the mower.

Having arrived at the field of operation, the pawl 23 is placed in operative relation to the ratchet wheel 22, and the attendant proceeds, after adjusting the wheels 46 to obtain a predetermined level of cut, to mow the lawn in the manner common to conventional forms of mowers. It will be seen, however, that when operating the present mower, where the cutting is considerably in advance of the supporting frame, the lawn may be finished close to standing objects, such as trunks of trees, or the mower may be passed beyond the edges of flower beds without carrying the wheels 14 or 46 across the edges of the said beds, and in this manner avoid breaking down the said edges.

It is obvious that if desired the wheel 14 may be provided with a face plate covering the internal gear formed in the said wheel in a manner common to present practice. When this place is employed, it is supported on the bars 55 and provides an opening for the axle 12 and shaft 19. Also, if desired, a cover may be provided, which is attached to the frame and the side bars 55 thereof to conceal and protect the drum 20 and parts connected therewith. These features are regarded as common to the art, and are not shown in the accompanying drawings for the purpose of simplifying the illustration of the invention.

In the modified form of the invention shown in Figs. 6 and 7, the cutter bar and cutting members mounted thereon are laterally extended from the path of the wheels 13 and 14.

Mowers when constructed in accordance with the modification may be operated either by hand or power. In the modified form, the levers 28 and 29 are substituted by connecting bars 59 and 60. The bars 59 and 60 operatively engage the slots 34 and 35 in the drum 20. The bars 59 and 60 are slidably mounted in a bracket 61 and are pivotally connected by yokes 62, with extensions 63 formed on the blades 25 and 26. A finger bar 64 is provided on the extension 65 of the bracket 61, the pivot for the said bar being concentric with the pivots of the extensions 63 in the yokes 62 when the said yokes are alined each with the other. This is the position shown in Fig. 6 of the drawings. The outer end of the finger bar 64 is supported by a shoe 66.

In the modified form shown in Figs. 6 and 7, the adjustment of the working plane of the cutting blades 25 and 26 is regulated by the following roller 67. The roller 67 is mounted in bearings in the vertically-adjustable bars 68 at the rear of the carrying frame of the mower. It is obvious that as the roller 67 is elevated or depressed, the bracket 61 and parts supported thereby are depressed or elevated. Thus in the modified form of the invention, the working level of the cutting blades is varied. It will be understood that with the variation thus effected by means of the roller 67, the shoe 66 is likewise elevated, any suitable means being provided for this purpose.

*Claims.*

1. In combination with a lawn mower having reciprocating cutting members and carrying wheels in the rear thereof; a plurality of flexible whips rotatively mounted above said reciprocating cutting members, the path of the free ends of said whips being juxtaposed to said cutters for operating as a brush for carrying material being operated upon to the rear of said cutters.

2. In combination with a reciprocating cutter; a rotary shaft disposed in superposed relation thereto; and a plurality of flexible whips mounted on said shaft, the path of the free ends of said whips being juxtaposed to said reciprocating cutter.

3. In combination with a reciprocating cutter; a rotary shaft disposed in superposed relation thereto; a plurality of flexible whips mounted on said shaft, the path of the free ends of said whips being juxtaposed to said reciprocating cutter; and driving mechanism for said shaft, said mechanism embodying carrying wheels supporting said cutter.

WILLIAM HILL.

Copies of this patent may be obtained for five cents each, by addressing the "Commissioner of Patents, Washington, D. C."